United States Patent Office 3,075,587
Patented Jan. 29, 1963

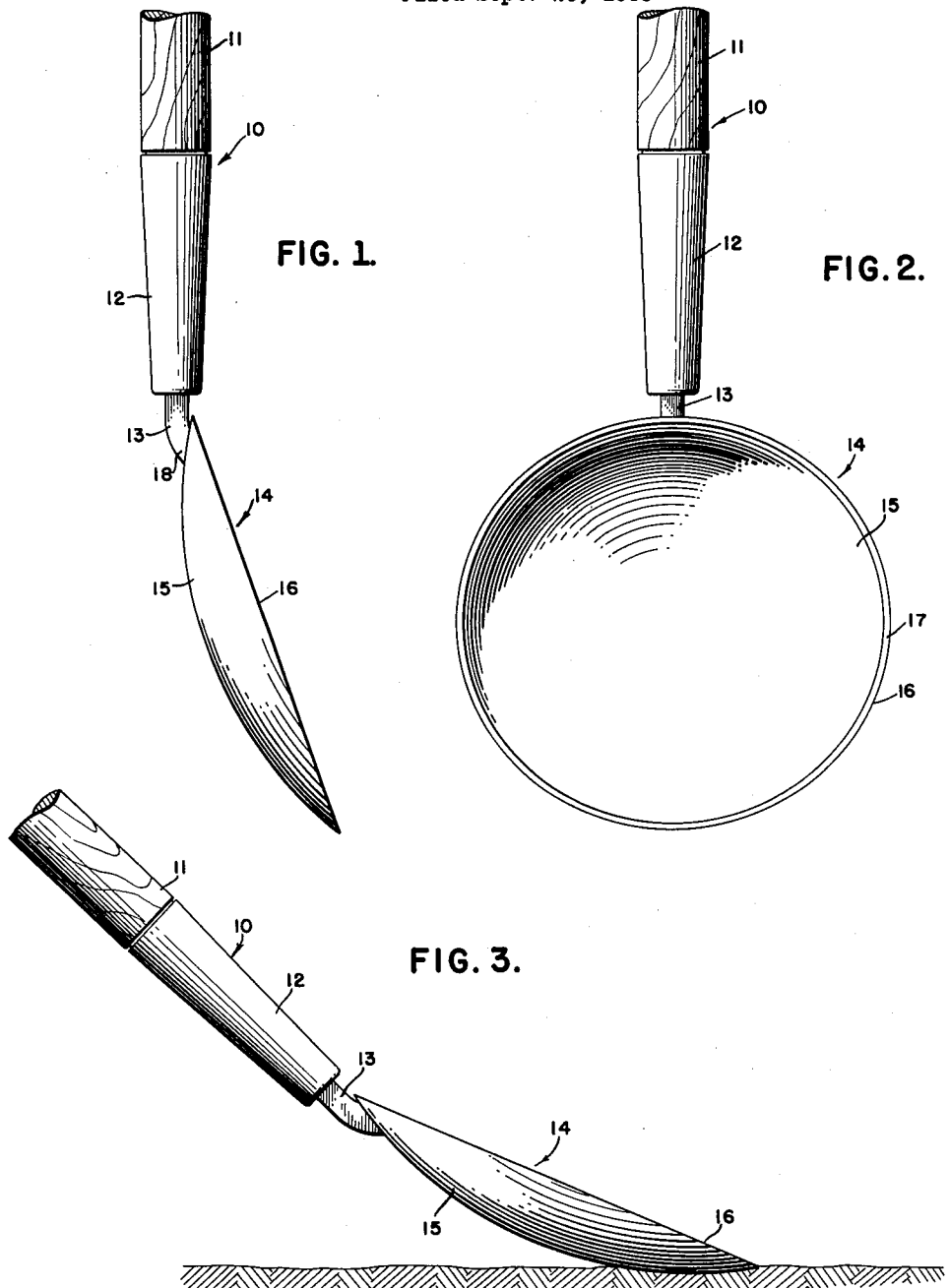

3,075,587
SKEW HOE
John B. Beaman, 815 Church St., Ahoskie, N.C., and Vivian L. Ott, 6100 Sylvan Ave., Norfolk, Va.
Filed Sept. 23, 1959, Ser. No. 841,744
1 Claim. (Cl. 172—371)

This invention relates in general to gardening implements and pertains, more particularly, to a disc type of hoe.

Of primary concern in connection with the present invention is the provision of a hoe type of implement which employs a head of disc form presenting a considerable extent of useful cutting area peripherally therearound, except at that portion thereof immediately adjacent to the point at which the handle is attached to the head.

Another object of this invention is to provide a disc type of hoeing implement wherein the head thereof is in the form generally of a saucer so that the implement may be used to cut in almost any direction, including lateral cutting motions as well as forward and rearward cutting motions and any angular cutting in between the forward and rearward motions and to either side and wherein the implement may be utilized for either shallow or deep cutting actions.

Still another object of this invention resides in the provision of an improved gardening implement, including an elongate handle and a head fixed to one end thereof in which the head is of concavo-convex circular configuration presenting a saucer-like appearance, with a handle assembly fixed to one marginal edge portion of the head so that the implement presents a cutting edge for almost the entire peripheral extent thereof and thereby permitting a versatility of the tool far exceeding conventional constructions of this general nature.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form its functional as well as conjointly cooperative equivalents are therefore intended to be embraced by the claim.

In the drawing:

FIG. 1 is a side elevational view of an implement constructed in accordance with this invention and illustrating the relative disposition between the handle and head thereof as well as the general profile of the head;

FIG. 2 is a front elevation of the assembly shown in FIG. 1, illustrating further the shape and construction of the head; and FIG. 3 is a side elevational view illustrating the implement in use.

Referring at this time more particularly to FIGS. 1 and 2, the implement is designated generally by the reference character 10 and includes a conventional handle construction in the form of an elongate wooden shaft 11 having the usual ferrule 12 at one end thereof and being provided with a metallic extension 13, by means of which the head assembly indicated generally by the reference character 14, is attached to the handle.

The head 14 is of circular shape as can be seen best in FIG. 2 and is of concavo-convex configuration. The main body portion 15 of the head 14, being dished, renders it relatively easy to sharpen the cutting edge 16 thereof by the simple provision of grinding away a flat, such as that indicated by the reference character 17. By virtue of its generally circular shape, the cutting edge is usable for substantially the complete circumferential extent thereof, with the exception of the area immediately adjacent the region in which the projection 13 is fixed to the head. This connection between the extension 13 is made as illustrated best in FIG. 1. The tip end portion 18 of the extension is preferably laterally directed, as shown, and provided with a flattened generally laterally facing end face which is engaged against the convex face of the head closely adjacent the periphery thereof and is rigidly affixed to the head preferably by welding.

The implement may be used in the manner illustrated in FIG. 3 in a forward direction, or it may be used laterally or even with a rearward cutting or chopping motion by tilting the device about the axis of the handle 11. Of course, the rearmost area of the cutting edge cannot be engaged with facility in the ground because this would necessitate laying the handle almost flat on the ground in order to do so. However, by tilting the device somewhat, at least some area of the rearwardly facing portion of the cutting edge may be utilized with a backward working motion. In this manner, the tool is usable for many purposes and is extremely versatile.

We claim:

A gardening implement comprising an elongate handle having a head rigidly affixed to one end thereof, said head being in the form of a concavo-convex circular disc presenting a cutting edge peripherally therearound, said handle including an extension at one end thereof, the outermost end of said extension being rigidly affixed to the exterior convex portion of said disc adjacent the peripheral edge thereof and so positioned relative to the plane containing the peripheral portion of the disc that said plane is almost coincidental with the plane containing the longitudinal axis of the handle and forms an obtuse angle with said longitudinal axis on the concave side of the disc.

References Cited in the file of this patent

UNITED STATES PATENTS

| | | |
|---|---|---|
| 469,359 | Robinson | Feb. 23, 1892 |
| 1,047,607 | Bennett | Dec. 17, 1912 |
| 1,387,127 | Church | Aug. 9, 1921 |
| 1,687,986 | Miller | Oct. 6, 1928 |
| 2,383,388 | Hughes | Aug. 21, 1945 |

FOREIGN PATENTS

| | | |
|---|---|---|
| 2,128 | Great Britain | Jan. 31, 1901 |